F. SCHAFER.
MACHINE FOR ASSEMBLING MATCH BOOKS, &c.
APPLICATION FILED MAY 16, 1913.
1,132,285.
Patented Mar. 16, 1915.
5 SHEETS—SHEET 1.
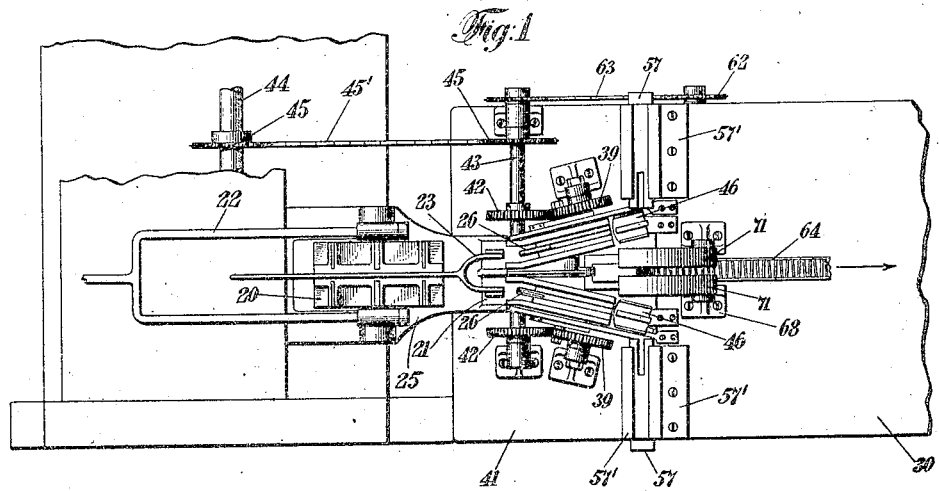
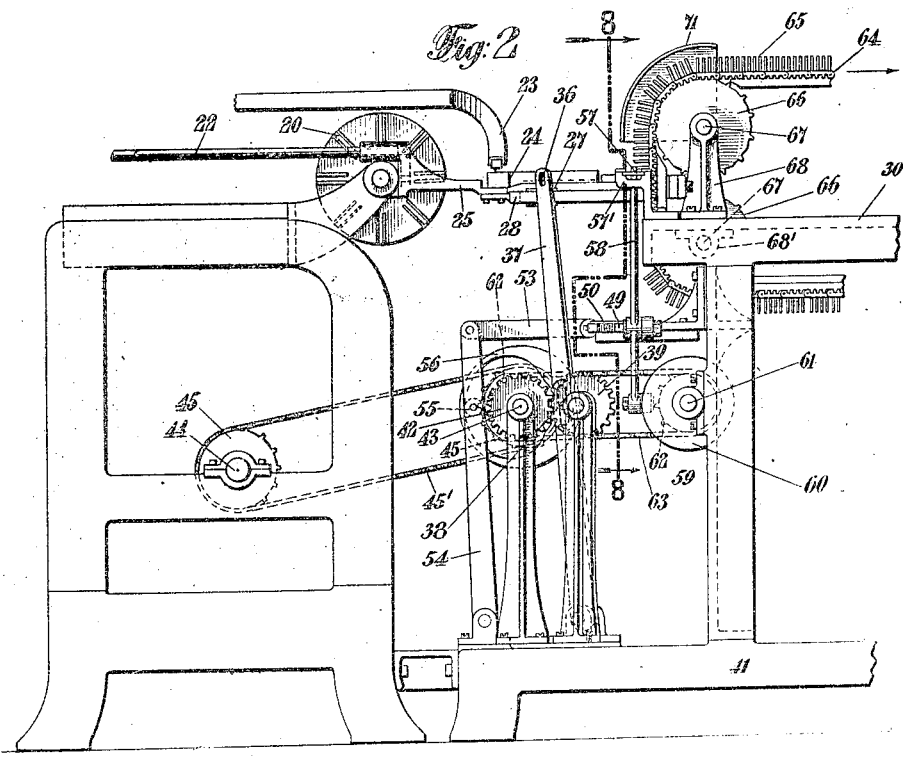
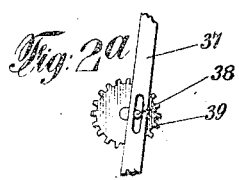
Witnesses:
Inventor
Frank Schafer
By his Attorney John R. Nolan

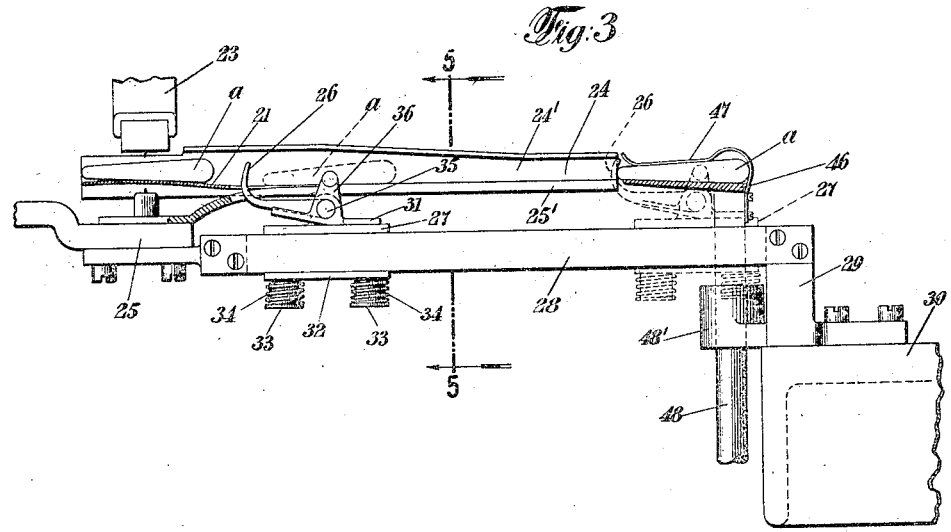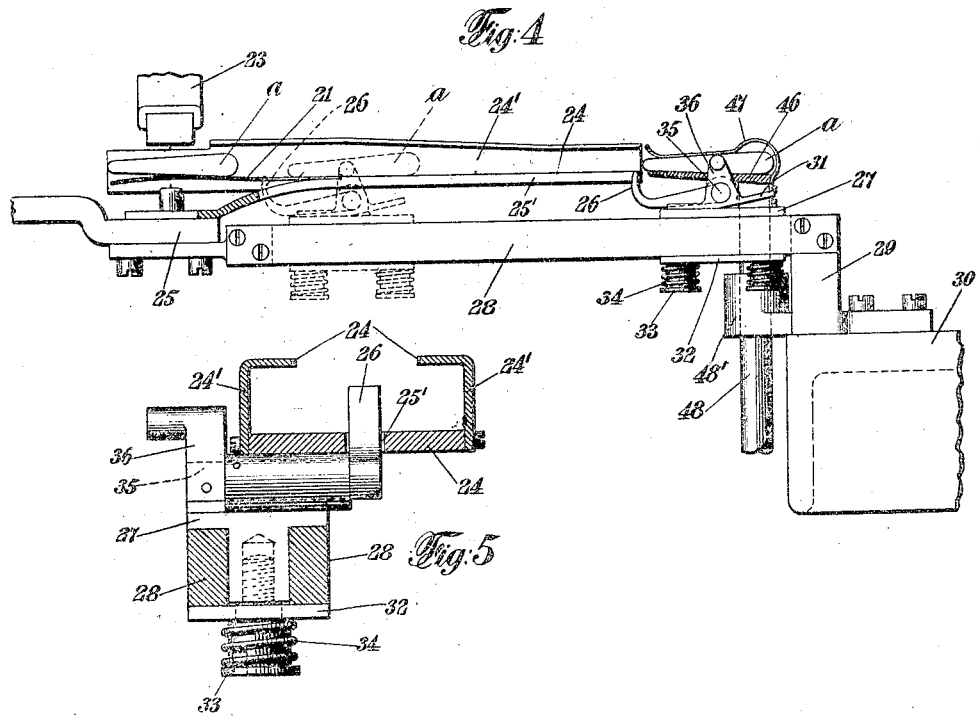

F. SCHAFER.
MACHINE FOR ASSEMBLING MATCH BOOKS, &c.
APPLICATION FILED MAY 16, 1913.

1,132,285.

Patented Mar. 16, 1915.
5 SHEETS—SHEET 3.

Witnesses:
M. B. Gowen
F. R. Griffin

Inventor
Frank Schafer
By his Attorney
John F. Noran

F. SCHAFER.
MACHINE FOR ASSEMBLING MATCH BOOKS, &c.
APPLICATION FILED MAY 16, 1913.
1,132,285.
Patented Mar. 16, 1915.
5 SHEETS—SHEET 4.
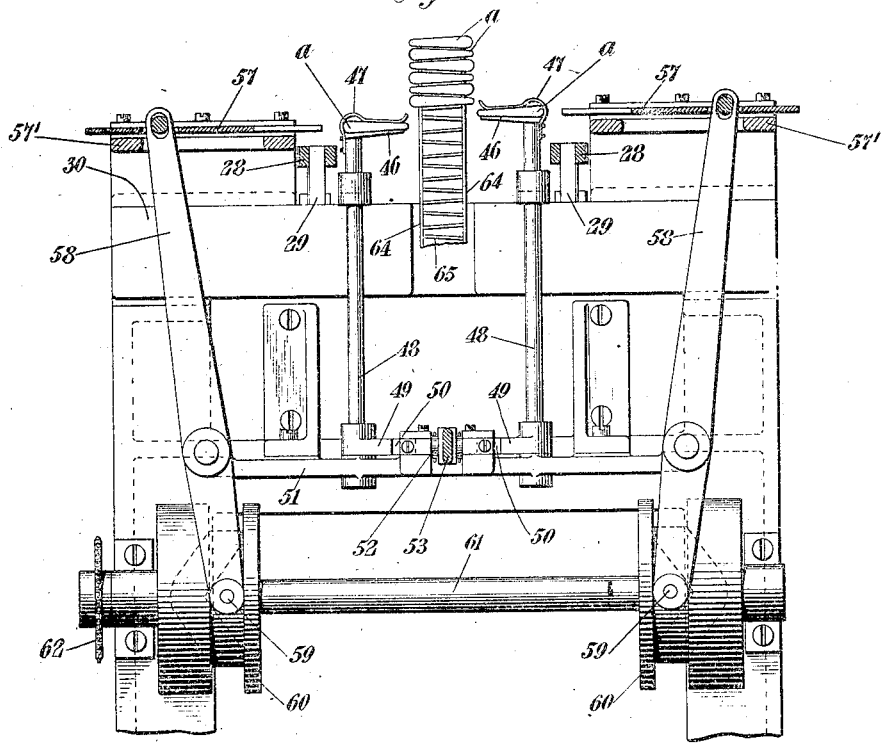
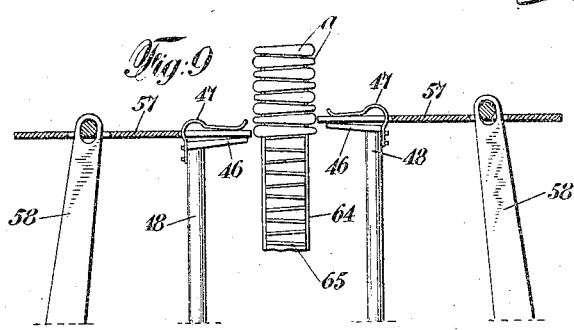
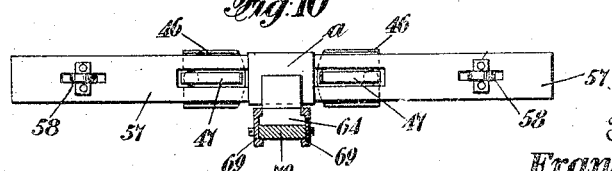
Witnesses:
Inventor
Frank Schafer
By his Attorney F. SCHAFER.
MACHINE FOR ASSEMBLING MATCH BOOKS, &c.
APPLICATION FILED MAY 16, 1913.
1,132,285.
Patented Mar. 16, 1915.
5 SHEETS—SHEET 5.
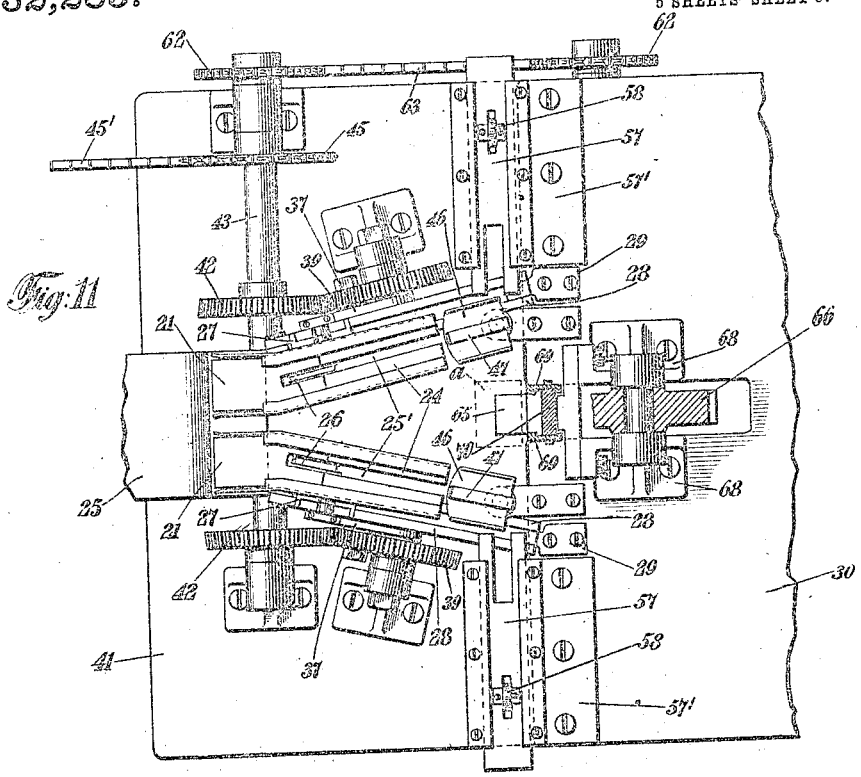
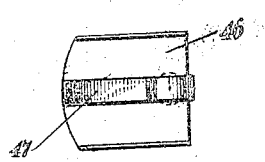
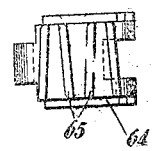
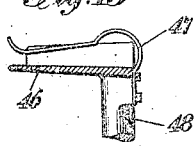
Witnesses:
M. B. Greeley
F. K. Griffin
Inventor
Frank Schafer
By his Attorney
John R. Nolan

UNITED STATES PATENT OFFICE.

FRANK SCHAFER, OF BARBERTON, OHIO, ASSIGNOR TO THE DIAMOND MATCH COMPANY, OF CHICAGO, ILLINOIS, A CORPORATION OF ILLINOIS.

MACHINE FOR ASSEMBLING MATCH-BOOKS, &c.

1,132,285.  Specification of Letters Patent.  Patented Mar. 16, 1915.

Application filed May 16, 1913. Serial No. 767,985.

*To all whom it may concern:*

Be it known that I, FRANK SCHAFER, a citizen of the United States, and resident of Barberton, in the county of Summit and State of Ohio, have invented certain new and useful Improvements in Machines for Assembling Match-Books, &c., of which the following is a specification.

This invention may be described as a modification of the assembling mechanism of the packing machine forming the subject of an application for Letters Patent of the United States, Serial No. 762,872 filed April 22, 1913, by Joseph C. Donnelly. The machine set out in the Donnelly application is therein illustrated as associated with the match-book machine described in Letters Patent of the United States No. 1,042,472, which latter machine is designed to produce match-books and discharge them in successive pairs with their larger or headed ends rearward. Among other things the Donnelly packing machine is constructed and arranged to receive the successive pairs of match-books as rapidly as they are thus discharged and to assemble them uniformly and compactly side by side with the ends of adjacent books in opposite relation to each other. As the present invention concerns simply the assembling mechanism of the Donnelly packing machine it is hardly necessary herein to consider the other instrumentalities of that machine. I shall, therefore, describe an illustrative form of embodiment of my invention and define the novel and characteristic features thereof in the appended claims.

Figure 6:
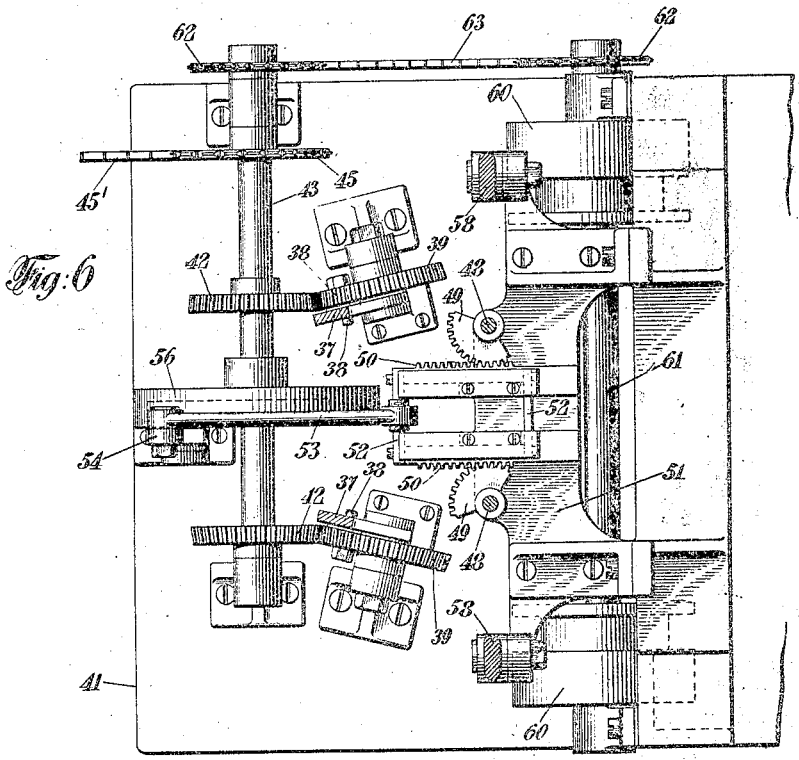
Figure 7:
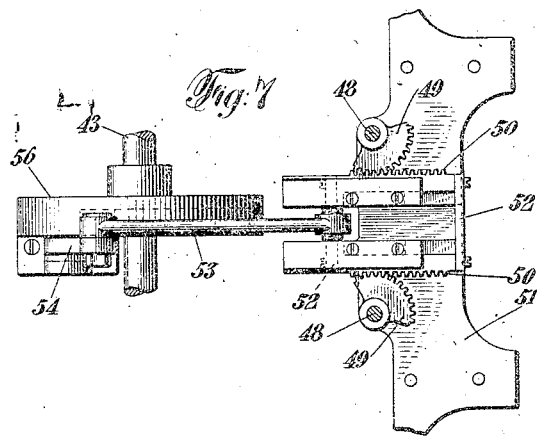

In the drawings—Figure 1 is a plan of a portion of a packing machine embodying my invention, showing the proximate part of the match-book making machine with which it is associated. Fig. 2 is a partial end elevation of Fig. 1. Fig. 2ª is a detail of the pin-and-slot connection between one of the rock-levers and its actuating gear wheel. Fig. 3 is a partial longitudinal section, enlarged, through one of the trackways into which the books are successively discharged from the match-book machine, showing the feeding-dog in elevation and the book-positioning head in section. In this view the dog is shown by the full lines, in its position at the beginning of the feeding stroke, and by the dotted lines in its position upon the completion of the stroke. Fig. 4 is a similar view, showing by the full lines the dog in its position at the beginning of the return stroke and by the dotted lines the dog in its position upon the completion of the stroke. Fig. 5 is a cross-section, enlarged, through the trackway, and adjuncts, as on the line 5—5 of Fig. 3. Fig. 6 is a horizontal section, enlarged, on a plane immediately below the table, showing the rack and sector gearing for actuating the book-positioning heads and with the carrier omitted. In this view the parts are shown in the relative position which they occupy when the heads are in book-receiving position adjacent the trackways. Fig. 7 is a sectional detail showing the position of the racks and sectors when the heads have been moved to discharging position. Fig. 8 is a partial transverse vertical section on a plane through the book-inserting slides, and adjuncts, as on the line 8—8 of Fig. 2; the guard piece adjacent the upper curve of the carrier being omitted. Fig. 9 is a sectional detail showing the book-slides in their inner position immediately upon the transference of the books from the respective heads to the endless book-carrier. Fig. 10 is a sectional plan of Fig. 9. Fig. 11 is a sectional plan of the book-feeding and assembling structure, including the book guideways, the positioning heads, the book-slides and the carrier. Fig. 12 is a plan of one of the positioning heads. Fig. 13 is a vertical section thereof. Fig. 14 is a plan of one of the links of the carrier chain. Fig. 15 is a side elevation of the link. Fig. 16 is a perspective of a match-book.

Referring to the book-match machine, which, in the present instance, constitutes the source of book supply for the packing apparatus, 20 designates the intermittently-rotatable pocketed wheel from which the finished match books (*a*) are discharged in pairs, headed ends rearward, upon yielding supporting plates 21 by the action of the reciprocating ejecting frame 22; and 23 designates the reciprocating fingers by means of which the free ends of the cover flaps of the books are tucked under the stapled end folds of the covers. When the tucking operation has been completed and the fingers leave the finished books, the latter are simultaneously pushed rearwardly by the next succeeding pair of books, and so on.

As the books are discharged from the book-making machine they fall upon the adjacent ends of two horizontally-disposed trackways 24, which, in accordance with one feature of my invention, diverge toward the book-positioning and assembling devices of the packing machine. In the present instance the trackways are attached to and project rearwardly from a bracket-piece 25 of the match-book machine. These trackways comprise bottom plates having lateral overhanging guide pieces 24' secured thereto; the spring plates 21 which support the books during the tucking operation above mentioned, being conveniently secured to the top of the bottom plates and between the respective guide pieces. Each of the bottom plates is longitudinally slotted to provide an opening 25' for the free passage of the upwardly-projecting head 26 of a feed-dog which, being reciprocative lengthwise of the trackway, engages the books successively and positively feeds them to the rearward end of the trackway and into a pocketed positioning-device as will presently appear. The dog is pivoted to a slide 27 which is seated in and between spaced bars 28 connected, each at one end, with the bracket 25 and at the opposite end to a bracket piece 29 on the table 30 of the packing machine. A tail-piece 31 on the dog, contacting with the opposing surface of the slide, limits the upward movement of the head 26 of the dog. The slide is preferably frictionally held to its seat, as, for example, by means of a plate 32 which, being loosely fitted to depending studs 33 on the slide, is pressed against the underside of the bars by suitably-disposed springs 34 on the studs. (See Figs. 3, 4 and 5.) The pivot stud 35 of the dog is provided at one end with a crank 36 having a pin-and-slot connection with the upper end of a vertical rock lever 37 which is fulcrumed in a bracket on the bed-plate, whereby during the oscillation of the lever the slide and the dog are timely actuated; that is to say, assuming the dog and slide to occupy the position indicated by the dotted lines in Fig. 4, the initial movement of the lever to the right correspondingly moves the crank pin in a manner to tip the dog and raise its upwardly-projecting head into the trackway and behind the book until the tail piece of the dog contacts with the slide as indicated by the full lines in Fig. 3, whereupon the lever in its continued movement impels the slide and dog with the result that the latter pushes the opposing book bodily along the trackway. When the lever 37 begins its return stroke, it pulls the crank pin to the left and thus tilts the dog to depress its head below the book-supporting surface of the trackway, as indicated by the full lines in Fig. 4, the body of the dog contacting with the slide, whereupon the slide and dog are moved as a unit to their original position adjacent the receiving end of the trackway for a repetition of the feeding operation upon the next succeeding match book. Since the slide is constantly under frictional pressure there is no liability of its longitudinal travel until the dog has been tilted to proper position at the beginning of each stroke of the lever.

In the present instance each of the levers 37 is timely operated through a crank-pin and slot connection 38 with a gear wheel 39 on a stud shaft which has its bearing in a standard on the bed 41 of the main frame, said gear wheel being in mesh with and actuated by a similar wheel 42 on the main shaft 43. This shaft 43 has its bearings in standards on the bed plate, and is driven directly from the driving shaft 44 of the packing machine through suitable gearing, such, for example, as the sprocket wheels 45 and chain 45'. (See Figs. 1, 2 and 2ᵃ).

The book-positioning devices at the discharge ends of the respective trackways include two oscillatory heads 46 one of which is on a slightly higher horizontal level than the other for a purpose below appearing. Each of these heads, in the present instance, comprises a channeled or pocketed body having an overhanging spring-member 47, whereby when the mouth of the head is in position adjacent to and in line with the trackway the book, by the feeding action of the dog thereon, will be bodily moved along the trackway and thrust into the grasp of the spring-member. When the books are entered into the respective heads, the latter are partially turned toward each other so as to position the books with their thinner ends directed toward the respective sides of the intermediate portion of the endless book carrier which is constructed and arranged to receive and support the books, side by side, with their thick and thin ends in alternation.

The means herein illustrated for periodically actuating the positioning heads is as follows: The heads are carried by vertical rock shafts 48 which have their bearings in suitably-disposed brackets 48' on the main frame. On the respective shafts 48 are oppositely-disposed gear sectors 49 which mesh with two parallel gear racks 50 slidingly fitted in spaced guide-ways in a bracket plate 51 on the main frame. These racks are united at their respective ends by crossbars 52, the forward one of which is conveniently connected by means of a link 53 with a vertical rock-lever 54 which is pivoted to a bracket on the bed place. This lever is operatively connected by means of a stud or roll 55 with a cam groove in the face of a cam body 56 fast on the main shaft 43, said groove being shaped to effect the timely movements of the lever, and thus reciprocate the racks in a manner to oscillate the sectors and their connections. (See Figs. 2, 6 and 7.)

When the pocketed heads are in position with the books therein pointing toward each other, said books are simultaneously transferred to the carrier (or other appropriate receiving and assembling structure,) by the action of two reciprocating slides 57, the acting ends of which are bifurcated in order to embrace and clear the spring 47 of the respective heads. These slides are fitted to guide-ways in brackets 57' rising from the table 30 and are pivotally connected with the upper arms of two rock-levers 58 which are pivoted to the bracket plate 51. The lower arms of these levers are operatively connected by means of studs or rolls 59 with the peripheral cam grooves of cam-bodies 60 on a shaft 61 which is geared with and driven from the main shaft 43, as, for example, by the sprocket wheels 62 and chain 63. The cam grooves are oppositely-disposed and their contour is such that at the proper interval of time they are actuated to push the opposing books into the carrier, one above the other; that is to say, when the pocketed heads are in their discharging position represented in Figs. 8, 9 and 10, the slides are actuated to push the books into the carrier and then to recede therefrom before the heads begin to turn to their receiving position represented in Figs. 1, 3, 4 and 11, and by virtue of the different horizontal planes of the books in the heads said books are assembled side by side (see Figs. 8 and 9).

The carrier structure herein shown to receive and support the successive pair of books, comprises an endless chain of pivotally connected links 64, each of which is provided with a series of outwardly-extending blades or jaws 65 (Figs. 14 and 15) between which the books are inserted and thereby held by lateral frictional contact. Only the receiving end of this carrier is shown, the same being represented as passing about a pair of spaced supporting wheels 66, the shafts 67 of which have their bearings in suitable brackets or supports 68, 68' on the table. (See Fig. 2). Vertical guide bars 69 (Figs. 10 and 11) on a suitably-disposed bracket 70, secured to the brackets 68 receive and support the edges of the portion of the carrier traveling between the wheels 66, which portion may be constantly or intermittently driven in any suitable manner to advance the book-holders thereof progressively to position for the reception of successive pairs of books from the positioning heads; such books thus being assembled in an orderly manner, side by side, with the head ends of the matches of adjacent books oppositely-disposed. A guard structure, comprising, for example, two oppositely-disposed flanged segments 71 arranged adjacent the course of the carrier as it rounds the upper wheel 66, is preferably provided to avoid any liability of accidental displacement of the match-books in their travel at this point. (See Figs. 1 and 2.)

Without intending to limit myself to the specific details of construction herein shown and described as illustrative of my invention, what I claim is—

1. In a machine for assembling match-books, and the like, the combination of a support providing a pathway for the articles, said support having a longitudinal slot in the bottom thereof, a reciprocating member movable longitudinally of said trackway, a guide for said member below said support, spring friction means for said member and its guide, a vibratory dog on said member having an upwardly projecting head movable through said slot, a lever for reciprocating said head, and an upwardly projecting crank-connection between the lever and the dog.

2. In a machine for assembling match-books, and the like, the combination of two horizontally-disposed positioning heads in spaced relation to each other, means for inserting articles in said heads, receiving means between said heads, means whereby the heads are shifted to direct the articles toward said receiving means, and means whereby the articles are transferred to the said receiving means.

3. In a machine for assembling match-books, and the like, the combination of two horizontally-disposed positioning heads in spaced relation to each other, means for inserting articles in said heads, a carrier arranged to travel between said heads having adjacent article-receiving portions, means whereby the heads are shifted to direct the articles toward the carrier, and means whereby the said articles are transferred to the said carrier.

4. In a machine for assembling match-books, and the like, the combination of two horizontally-disposed positioning heads in spaced relation to each other, rock-shafts for said heads, means for inserting the articles in said heads, receiving means between said heads, means whereby the shafts are actuated to turn the heads to position with their contained articles directed toward the receiving means, and means whereby the said articles are transferred to the said receiving means.

5. In a machine for assembling match-books and the like, the combination of two horizontally-disposed positioning heads in spaced relation to each other, rock-shafts for said heads, means for inserting the articles in said heads, receiving means between said heads, gear mechanism for simultaneously actuating the shafts to turn the heads to positions with their contained articles directed toward the said receiving means, and means whereby the said articles are transferred to the said receiving means.

6. In a machine for assembling matchbooks, and the like, the combination of two diverging pathways for the articles, positioning heads at the outer ends of said pathways, means for inserting the articles in said heads, receiving means between said heads, means whereby the heads are shifted to direct the articles toward the said receiving means, and means whereby the said articles are transferred to the said receiving means.

7. In a machine for assembling matchbooks, and the like, the combination of two diverging pathways for the articles, partially-rotatable positioning heads at the outer ends of said pathways, means for inserting the articles in said heads, receiving means between said heads, means whereby the heads are partially-turned to direct the contained articles toward the receiving means, and means whereby the said articles are transferred to the said receiving means.

8. In a machine for assembling matchbooks, and the like, the combination with a source of article supply, of two diverging pathways to receive the articles in successive pairs from said source of supply, partially-rotatable positioning heads at the outer ends of said pathways, means for feeding the articles along said pathways and into the opposing heads, a carrier between said heads having adjacent article-receiving portions, means whereby the heads are partially-turned to direct the contained articles toward the carrier, and means whereby the said articles are transferred to the said carrier.

Signed at Barberton, in the county of Summit and State of Ohio this 13th day of May A. D. 1913.

FRANK SCHAFER.

Witnesses:
W. L. JOHNSTON,
SABINA PARKS.